C. C. CAREY.
SCALE CHECK PERFORATOR.
APPLICATION FILED JAN. 2, 1914.
1,129,639.
Patented Feb. 23, 1915.
2 SHEETS—SHEET 1.
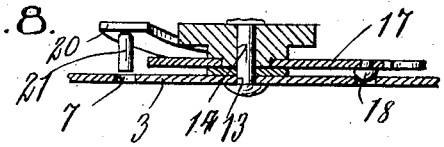
FIG. 8.
FIG. 1.
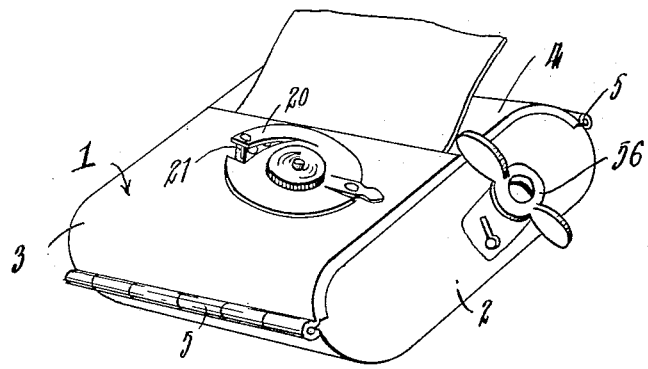
FIG. 2.
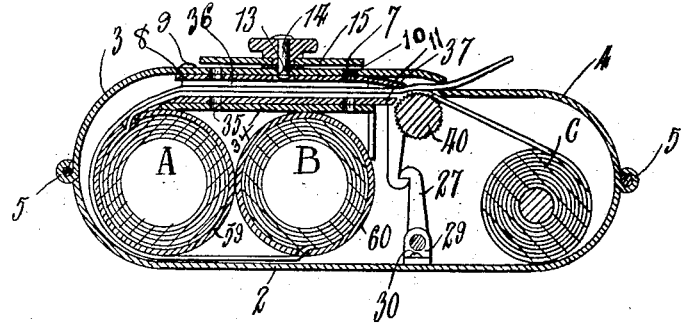
FIG. 3.
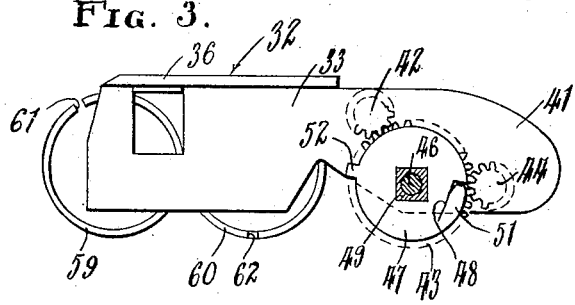
Witnesses
C. W. Newbold
H. Kaye Martin
Inventor
C. C. Carey.
By
Attorney C. C. CAREY.
SCALE CHECK PERFORATOR.
APPLICATION FILED JAN. 2, 1914.
1,129,639.
Patented Feb. 23, 1915.
2 SHEETS—SHEET 2.
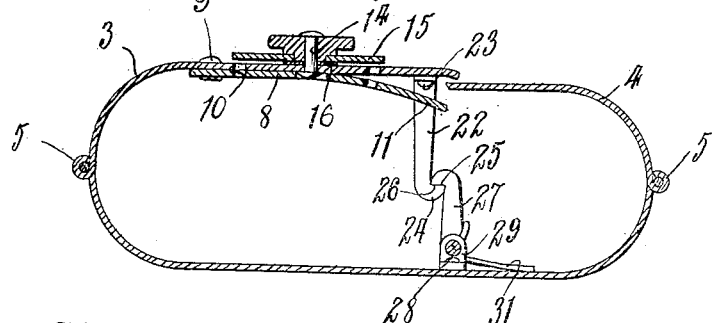
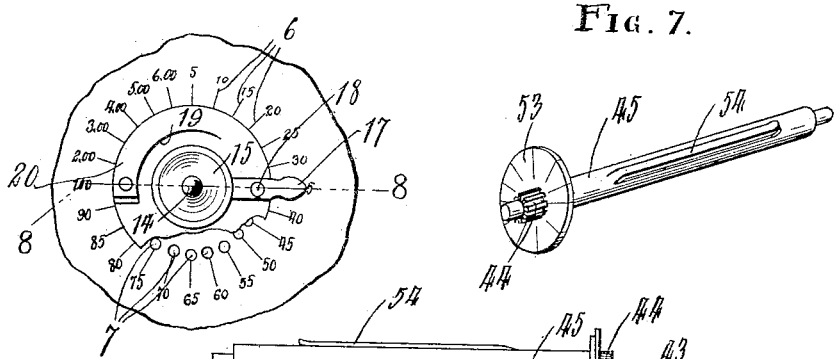
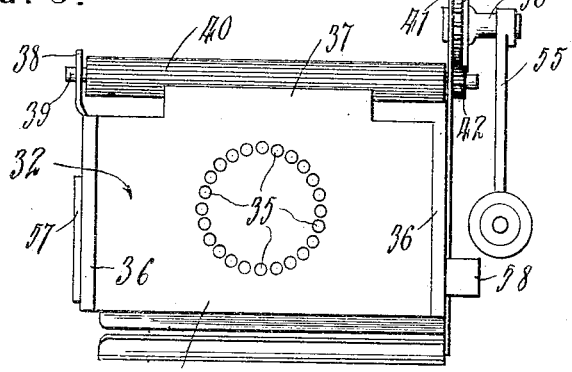
Witnesses
Inventor
C. C. Carey.

UNITED STATES PATENT OFFICE.

CLARENCE C. CAREY, OF NEW YORK, N. Y.

SCALE-CHECK PERFORATOR.

1,129,639.  Specification of Letters Patent.  Patented Feb. 23, 1915.

Application filed January 2, 1914. Serial No. 809,926.

*To all whom it may concern:*

Be it known that I, CLARENCE C. CAREY, a citizen of the United States, residing at New York, in the county of New York and State of New York, have invented certain new and useful Improvements in Scale-Check Perforators; and I do hereby declare the following to be a full, clear, and exact description of the invention, such as will enable others skilled in the art to which it appertains to make and use the same.

This invention relates to new and useful improvements in check perforators, and has for its principal object to provide a simple and effective checking means for restaurants and other public places wherein it is desirable to furnish a customer with a check notifying the cashier of the amount of the purchase.

Another object of the invention is to provide a simple and effective means by which the amount of checks will be recorded, thereby facilitating the proper checking up of the amount of sales when it is desired.

A further object of the invention is to protect a proprietor from dishonesty among his clerks and thereby eliminate any loss through that source.

A still further object of the invention is to provide a simple and effective device which may be quickly and easily operated and of such construction as to be compact and easily handled.

With the above and other objects in view, the invention consists in the novel combination and arrangement of parts, which will be fully set forth in the following specification and accompanying drawings, in which—

Figure 1 is a perspective view of a checking device constructed in accordance with this invention, Fig. 2 is a longitudinal sectional view of the same, Fig. 3 is a side view in elevation of the interior mechanism to clearly illustrate the supporting frame on which the mechanism is mounted, Fig. 4 is a longitudinal sectional view the casing showing the interior mechanism removed, Fig. 5 is a top plan view of the interior mechanism, showing the same as it would appear when out of the casing and in its unloaded position, Fig. 6 is a top plan view of a fragment of the casing showing in detail the dial and punch, Fig. 7 is a detail perspective view of the shaft upon which the recording checks are rolled, and Fig. 8 is an enlarged detail sectional view taken on line 8—8 of Fig. 6.

Referring now to the drawings by characters of reference, the numeral 1 designates as an entirety the casing which surrounds the mechanism of the checking device and is preferably formed of the bottom member 2 having hinged thereto, the top members 3 and 4. The hinges which are illustrated by the numeral 5 extend entirely across the casing and are designed to cover the entire bottom and interior mechanism when the device is in its closed position as illustrated in Fig. 1.

The punching dial which is carried by the element 3 of the casing, is designated by the numeral 6, and is provided with a plurality of numerals or other characters to indicate the amount of the check which is punched. A plurality of spaced apertures 7 are arranged in direct alinement with the graduations 6, so as to form dies which coöperate with the plunger which will be more fully hereinafter described. A suitable resilient plate 8 is riveted or otherwise secured to the inner sides of the element 3 as at 9, and is provided with a plurality of apertures 10 which register with the apertures 7 as clearly illustrated in Figs. 2 and 4. The free end of the resilient plate 8 is bent downwardly as at 11 and is adapted to frictionally engage the feeding roller, which will be more fully hereinafter described. A centrally located aperture 13 is formed in each of the plates 3 and 8 and is adapted to receive the rivets 14 by means of which the punch carrying disk 15 is pivotally secured to the element 3. This punch-carrying disk is spaced from the element 3 by means of the washer 16 and is provided with a resilient extension 17 which is pointed as clearly illustrated and is adapted to aline with the characters around the dial 6 as clearly shown in Fig. 6. This resilient extension 17 is provided with a hemispherical extension 18 which is adapted to register with the apertures 7 to hold the plate 15 in the desired position. A slit 19 extends around the plate 15 for a portion of its circumference and is spaced from the periphery of the plate as clearly shown in Fig. 6. The material between the slit 19 and the body portion of the plate 15 is bent upwardly to form the resilient tongue 20 which carries at its free end the rod 21. This punch rod 21 conforms to the size and shape of the apertures 7 and is slidable therethrough.

A pair of arms 22 are riveted or otherwise secured as at 23 to the free end of the element 3 forming a portion of the top of the casing and each of these arms 22 is provided with the enlarged end 24 having the flat portion 25 formed thereon which coöperates with the flat portion 26 formed on the pivoted arm 27 to hold the top in its locked position. The arm 27 is rigidly secured to the rod 28 which is journaled in the ear 29 as clearly shown in Figs. 2 and 4. This ear 29 is riveted or otherwise secured as at 30 to the bottom of the casing and forms a support for the rod as clearly shown. A suitable coil spring surrounds the shaft 28, and one end of the same is extended as at 31 to engage the bottom of the casing, while the opposite end of said spring is extended upwardly and engages one of the arms 27 and is adapted to exert pressure thereagainst, thus forcing said arm forwardly and into engagement with the coöperating extension 22. Thus it will be seen that a spring latch will be formed which will automatically lock the casing in its closed position when the element 3 of the top is forced downwardly.

The interior mechanism of the device, which is designated generally by the numeral 32, preferably comprises the frame 33 having the die plate 34 secured thereto. Both the frame and the die plate are provided with the apertures 35 which are so arranged as to register with the apertures 7 and 10 which are formed in the cover element 3 and the resilient plate 8 respectively. The die plate 34 is provided at its lateral extremity with the guides 36, beneath which the lateral edges of the paper which forms the checks, are adapted to slide when the device is in use. At the forward end of the die plate 34 is preferably provided the tongue 37 which guides the paper over the friction roll and prevents the same from being fed in the wrong direction. The frame 33 is provided with the ear 38 having an aperture through which the stem 39 of the friction roller 40 is adapted to extend. The opposite end of the friction roll extends through an aperture formed in the extension 41 as clearly shown in Fig. 5 and is provided with a spur gear 42, which meshes with the large gear 43 which is also rotatably mounted on the exterior of the extension 41. A suitable spur gear 44 is mounted in the extension 41 as clearly shown and has secured thereto the roller 45, the use of which will be more fully hereinafter described.

The gear 43 is rotatably mounted on the shaft 46 which shaft is journaled in the extension 41. A suitable disk 47, having the slit 48 formed therein, is mounted on the squared portion 49 of the member 50, and is adapted to rotate therewith. The slit 48 extends for a short distance inwardly from the periphery of the disk 47 and forms the resilient tongue 51 which is adapted to engage the depressions in the surface of the gear 43 and turn the same in the desired direction. A suitable stop 52 is formed on the periphery of the disk 47 and prevents said disk from making a complete revolution, thus it will be seen that by properly gearing the friction roll 40, the proper amount of paper will be fed upon a single operation of the operating mechanism. The roller, which is indicated by the numeral 45, is provided at one end with the gear 44 and guide flange 53 which is so arranged to prevent the paper from becoming entangled in the operating mechanism. A suitable tongue 54 is formed integral with the periphery of the roller and is adapted to frictionally engage the ends of the paper which is to be rolled thereon when the device is in use.

A suitable operating lever 55 is removably secured to the end of the element 50 as clearly shown in Fig. 5, but should it at any time be desired, it is to be understood that the wing button 56 illustrated in Fig. 1 may be substituted therefor without in any way departing from the spirit of the invention.

At suitable intervals on the frame 33 is provided the outward extensions 57 and 58 which are so arranged that they act as supports for the same and prevent the same from becoming displaced within the casing. A pair of cylindrical shells 59 and 60 respectively are arranged beneath the frame as shown in Fig. 3, and are provided with the slots 61 and 62 respectively through which the paper passes when the same is being unrolled. These shells are arranged to receive the checking roll A, and the roll B from which the checks are made, as clearly shown in Fig. 2. The paper which comes from the roll A is fed through the slot 61 and across the die plate 34, then over the friction roll 40 and to the roll C, which is mounted on the roller 45 as shown. The paper which is contained in the roll B, passes through the slot 62 and over the outer surface of the shell 59, then upwardly and over the first mentioned disk of paper across the die plate 34, over the friction roll 40, and through the opening formed between the ends of the element 3 and the element 4, as clearly shown in Figs. 1 and 2. Owing to the bent end of the element 3, it will be evident that the user may easily tear the slip from the end of the strip and the device will be ready for the next operation. Owing to the fact that the two strips of paper pass over the guide plate 34 and across the apertures 35, it will be apparent that when the user adjusts the disk and pointer to the desired position on the dial that the punch rod may be depressed and will pass through both layers of paper, thus recording the amount of purchase both on the check and on the recording ribbon, which rolls upon the roller 45.

It will be evident that when it is desired to check the purchases together with the customer's check, that the roll B may be removed and the checks compared with the holes punched in the roll B, thus affording a means whereby the proprietor of a restaurant may at all times ascertain the condition of the accounts.

While in the foregoing there has been shown and described the preferred embodiment of this invention, it is to be understood that such changes may be made as will fall within the spirit and scope of the appended claim.

Having thus described my invention, I claim:

In a device of the character described, the combination with a casing having a pair of hinged cover elements secured thereto, a disk rotatably mounted in the center of one of the elements, said hinged cover element being provided with a plurality of apertures arranged in a circle, and concentric with the disk, a punch rod carried by the disk, means to hold the punch rod over the desired aperture, of a guide plate removably secured within the casing to guide separate rolls of paper thereover, the free ends of said rolls of paper being passed over the guide plate, said guide plate having apertures formed therein and being adapted to register with the apertures in the cover element, a roller adapted to receive the end of one of the rolls of paper and roll said paper thereon, the free end of the other roller being passed through a slot in the casing after the same has been punched to form a customer's check, and means to feed the paper through the slot.

In testimony whereof I affix my signature in presence of two witnesses.

CLARENCE C. CAREY.

Witnesses:
ERNEST V. NICHOLS,
CLEMENT M. COTTRELL.

Copies of this patent may be obtained for five cents each, by addressing the "Commissioner of Patents, Washington, D. C."